US008248383B2

(12) United States Patent
Dews et al.

(10) Patent No.: US 8,248,383 B2
(45) Date of Patent: Aug. 21, 2012

(54) MULTI-TOUCH TOUCH SCREEN WITH SINGLE-LAYER ITO BARS ARRANGED IN PARALLEL

(75) Inventors: Christopher William Dews, Fremont, CA (US); Charles Henry Seaborg, Jr., Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 618 days.

(21) Appl. No.: 12/427,460

(22) Filed: Apr. 21, 2009

(65) Prior Publication Data

US 2009/0267914 A1    Oct. 29, 2009

Related U.S. Application Data

(60) Provisional application No. 61/047,731, filed on Apr. 24, 2008.

(51) Int. Cl.
*G06F 3/041* (2006.01)

(52) U.S. Cl. .................... 345/173; 178/18.01

(58) Field of Classification Search ............ 345/156, 345/173, 174–177; 178/18.01, 18.02–18.09
See application file for complete search history.

(56) References Cited

U.S. PATENT DOCUMENTS

| 5,650,597 | A | * | 7/1997 | Redmayne | 178/18.06 |
|---|---|---|---|---|---|
| 5,844,506 | A | | 12/1998 | Binstead | |
| 5,914,465 | A | | 6/1999 | Allen et al. | |
| 5,942,733 | A | | 8/1999 | Allen et al. | |
| 6,137,427 | A | | 10/2000 | Binstead | |
| 6,188,391 | B1 | | 2/2001 | Seely et al. | |
| 6,239,389 | B1 | * | 5/2001 | Allen et al. | 178/18.01 |
| 6,288,707 | B1 | | 9/2001 | Philipp | |
| 6,297,811 | B1 | | 10/2001 | Kent et al. | |
| 6,452,514 | B1 | | 9/2002 | Philipp | |
| 6,466,036 | B1 | | 10/2002 | Philipp | |
| 6,535,200 | B2 | | 3/2003 | Philipp | |
| 7,129,935 | B2 | | 10/2006 | Mackey | |
| 7,148,704 | B2 | | 12/2006 | Philipp | |
| 7,202,859 | B1 | | 4/2007 | Speck et al. | |
| 7,295,190 | B2 | | 11/2007 | Philipp | |
| 7,362,313 | B2 | * | 4/2008 | Geaghan et al. | 345/173 |
| 7,797,115 | B2 | * | 9/2010 | Tasher et al. | 702/57 |

\* cited by examiner

*Primary Examiner* — Abbas Abdulselam

(74) *Attorney, Agent, or Firm* — Hayes & Boone LLP

(57) ABSTRACT

A touch screen includes a plurality of single-layer ITO bars having a substantially rectangular shape and arranged in parallel to each other in order to detect touches on the touch screen. The location of a touch on the touch screen in the direction along an ITO bar is determined by applying a signal on one end of the ITO bar and measuring the change in the amplitude and the delay of the signal on the opposite end of the ITO bar. Such application and measurement of the signal can be repeated with the application of the signal occurring on the opposite end of the ITO bar and the measurement of the signal occurring on said one end of the ITO bar, in order to enhance the accuracy of the measurement.

17 Claims, 9 Drawing Sheets

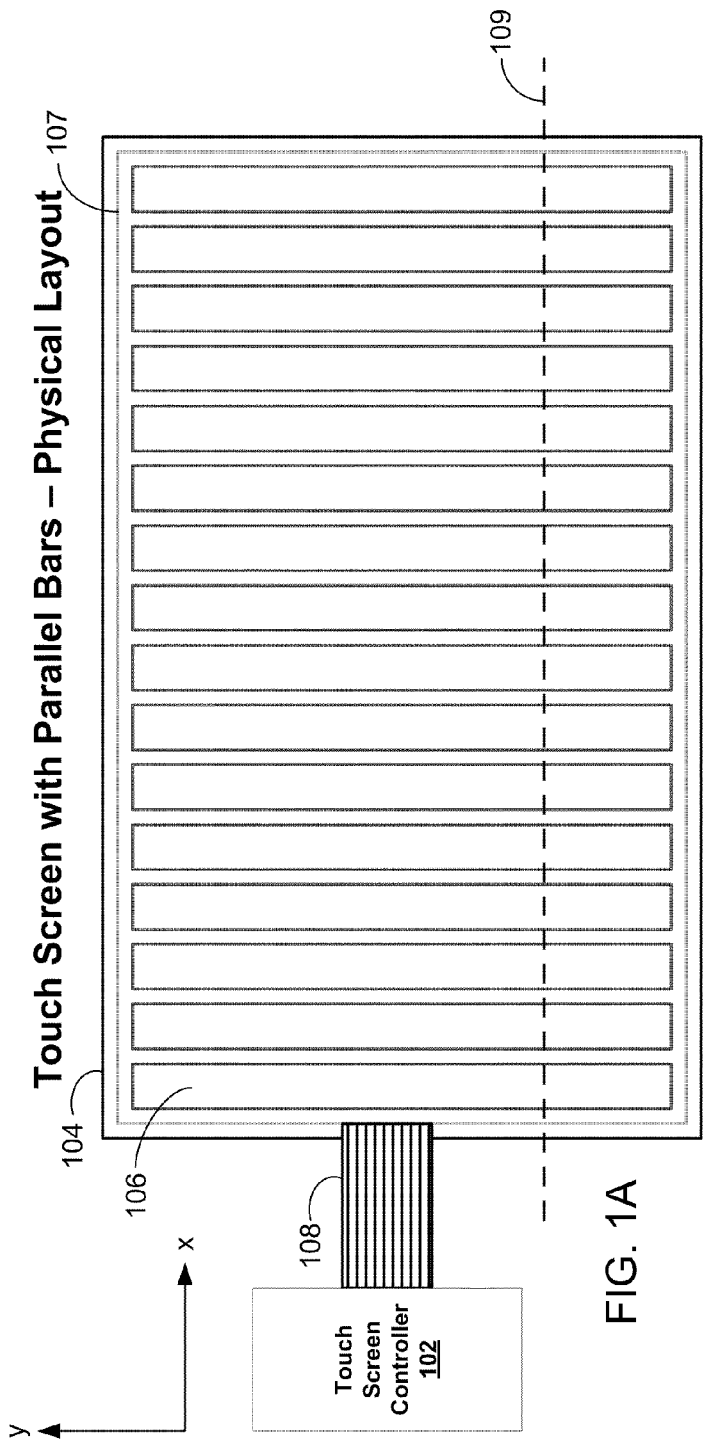
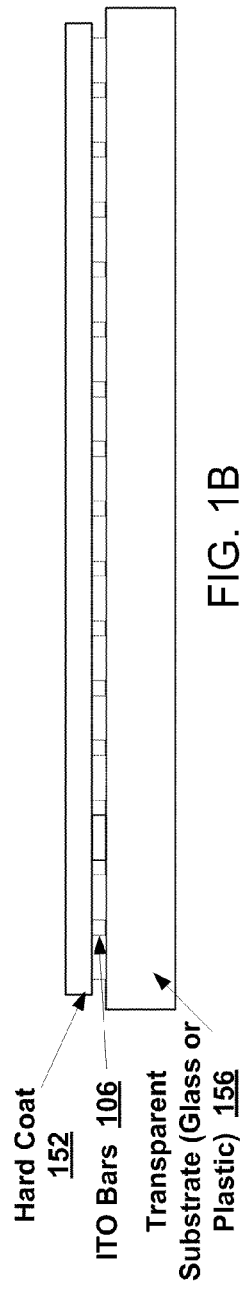
FIG. 1A
FIG. 1B

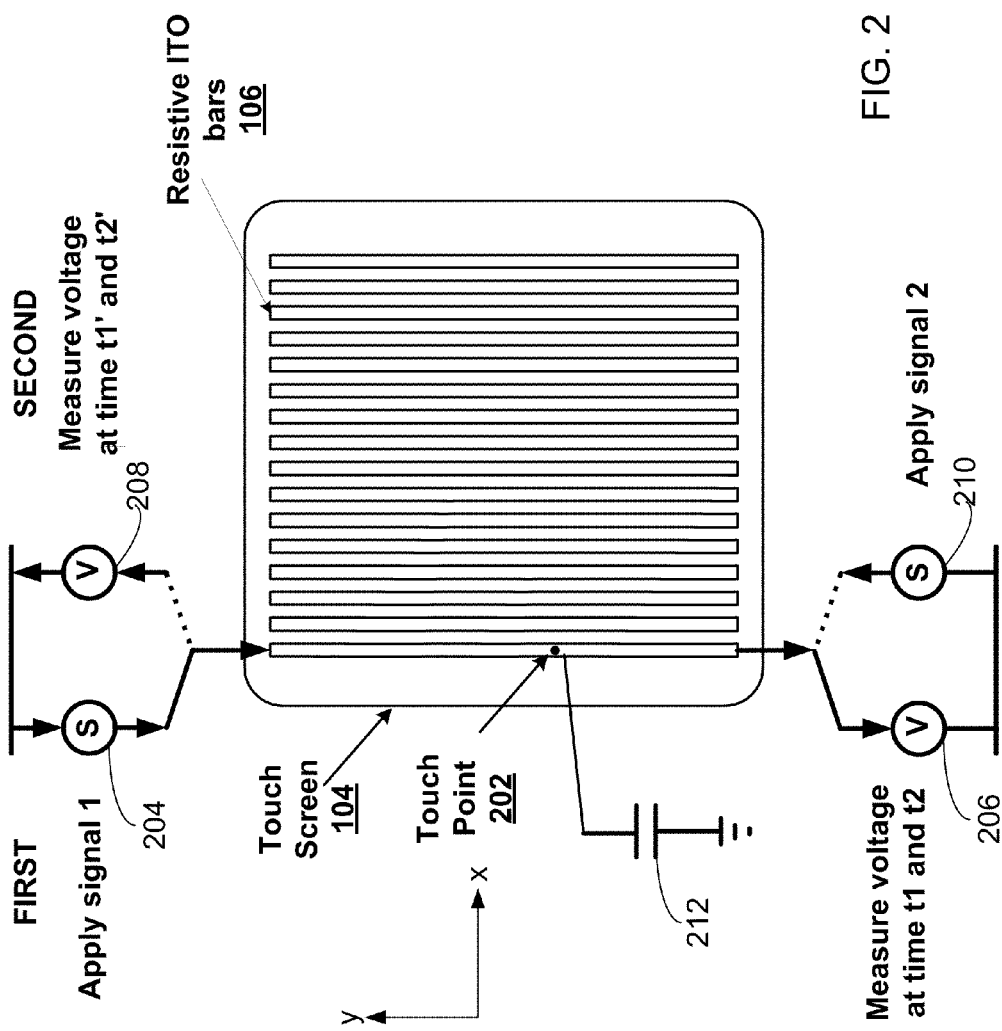

MULTI-TOUCH TOUCH SCREEN WITH SINGLE-LAYER ITO BARS ARRANGED IN PARALLEL

CROSS-REFERENCE TO RELATED APPLICATION

This application claims priority under 35 U.S.C. §119(e) from U.S. Provisional Patent Application No. 61/047,731, entitled "Multi-Touch Touch Screen with Single-Layer ITO Bars Arranged in Parallel," filed on Apr. 24, 2008, the subject matter of which is incorporated by reference herein in its entirety.

BACKGROUND OF THE INVENTION

1. Field of the Invention

The present invention relates to a touch screen and a method for detecting touches and the touch location on the touch screen.

2. Description of the Related Arts

Modern electronic devices often have touch sensors to receive input data. There are a variety of types of touch sensor applications, such as touch screens, touch buttons, touch switches, touch scroll bars, and the like. Touch sensors have a variety of types, such as resistive type, capacitive type, and electromagnetic type. A capacitive touch screen is coated with a transparent conductive material, typically Indium Tin Oxide (ITO), that conducts continuous electrical current across a sensor. The sensor exhibits a precisely controlled field of stored electrons in both the horizontal and vertical axes of a display to achieve capacitance. The human body is also an electrical device which has stored electrons and therefore also exhibits capacitance. When the sensor's normal capacitance field (its reference state) is altered by another capacitance field, e.g., by the touch with someone's finger, capacitive type touch sensors measure the resultant distortion in the characteristics of the reference field and send the information about the touch event to the touch screen controller for mathematical processing. There are a variety of types of capacitive touch sensors, including Sigma-Delta modulators (also known as capacitance-to-digital converters (CDCs)), charge transfer type capacitive touch sensors, and relaxation oscillator type capacitive touch sensors.

Conventional touch screens typically require multiple layers of ITO to detect multiple touches on the touch screen. Some conventional touch screens may use a single ITO layer, but they are not capable of determining the location of multiple simultaneous touches due to the way the single ITO layer is disposed on the touch screen.

SUMMARY OF THE INVENTION

Embodiments of the present invention include a touch screen including single-layer ITO bars having a substantially rectangular shape and arranged in parallel to each other in order to detect touches on the touch screen. The location of a touch on the touch screen in the direction along an ITO bar is determined by applying a signal on one end of the ITO bar and measuring the change in the amplitude and the delay (shift in phase) of the signal on the opposite end of the ITO bar. Such application and measurement of the signal is also repeated with the application of the signal occurring on the opposite end of the ITO bar and the measurement of the signal occurring on said one end of the ITO bar, in order to enhance the accuracy of the measurement. The location of the touch on the touch screen in the direction across the ITO bars is detected by determining which one of the multiple ITO bars is touched. The touch screen including single-layer parallel ITO bars according to the present invention enables detection of multiple touches on the touch screen with reduced noise sensitivity.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 1A illustrates a plan view of a touch screen layout, according to one embodiment of the present invention.

FIG. 1B is a cross-sectional view of the touch screen across line 109 of FIG. 1A, according to one embodiment of the present invention.

FIG. 2 illustrates how measurements are made in order to determine the y position of a touch along the ITO bars on the touch screen, according to one embodiment of the present invention.

DETAILED DESCRIPTION OF EMBODIMENTS

Figure 3:
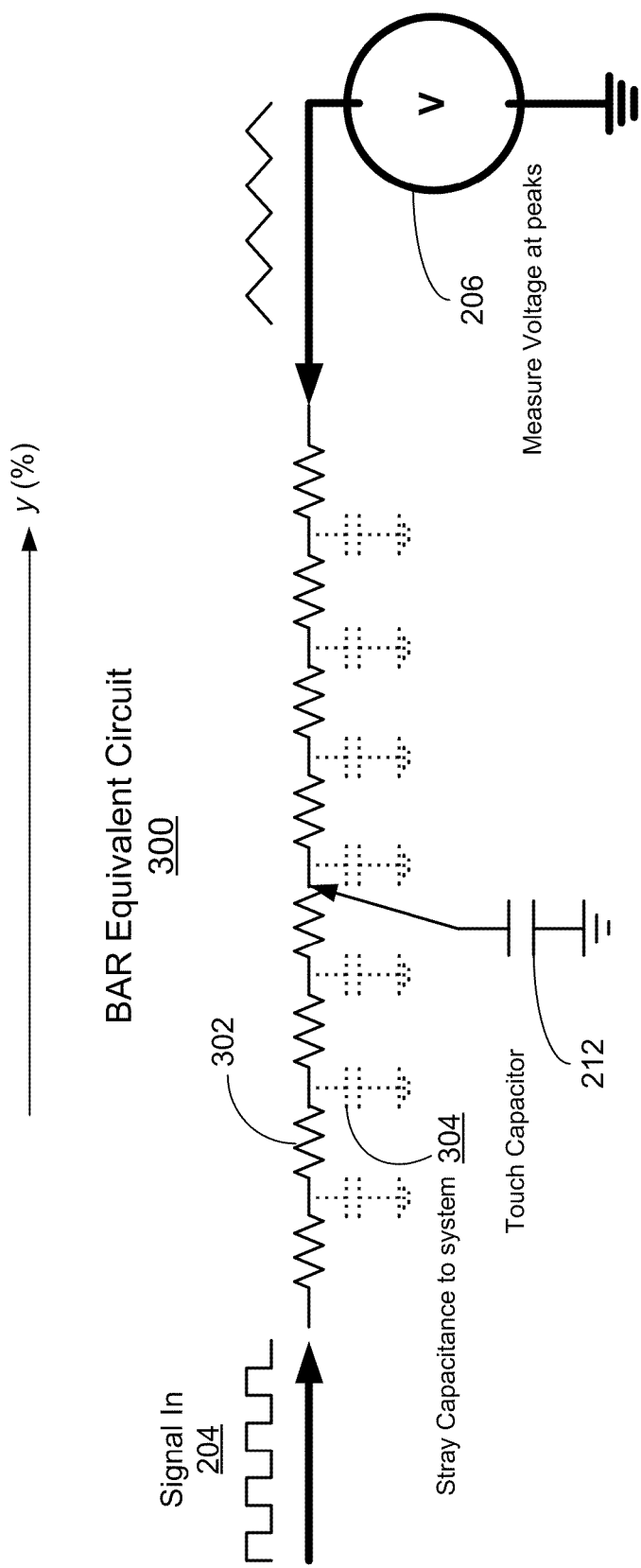
FIG. 3 illustrates the equivalent circuit of an ITO bar to show how the y position of the touch along the ITO bars is determined, according to one embodiment of the present invention.

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, a touch screen includes a plurality of single-layer ITO bars having a substantially rectangular shape and arranged in parallel to each other in order to detect touches on the touch screen. The location of a touch on the touch screen in the direction along an ITO bar is determined by applying a signal on one end of the ITO bar and measuring the change in the amplitude and the delay (shift in phase) of the signal on the opposite end of the ITO bar. Such application and measurement of the signal can be repeated with the application of the signal occurring on the opposite end of the ITO bar and the measurement of the signal occurring on said one end of the ITO bar, in order to enhance the accuracy of the measurement. The location of the touch on the touch screen in the direction across the ITO bars is detected by determining which one of the multiple ITO bars is touched. The touch screen including single-layer parallel ITO bars according to the present invention enables detection of multiple touches on the touch screen with reduced noise sensitivity.

FIG. 1A is a plan view of a touch screen layout according to one embodiment of the present invention, and FIG. 1B is a cross-sectional view of the touch screen across line 109 of FIG. 1A. Touch screen 104 is a capacitive touch screen, and is connected to touch screen controller 102 via interconnect 108. Touch screen controller 102 performs a variety of functions to determine the touches and the locations of the touches on the touch screen 104, as explained below.

Touch screen 104 includes a transparent substrate (glass or plastic) 156, parallel bars 106 of ITO (Indium Tin Oxide) material or other conductive, transparent material disposed on the substrate 156 with substantially rectangular shapes, and a transparent hard coat 152 covering the ITO bars 106 and the substrate 156. Although substantially rectangular ITO bars 106 are used herein, note that other types of conductive, transparent material may be used in place of the ITO bars 106 with different shapes as well. As shown in FIGS. 1A and 1B, the touch screen 104 of the present invention includes a plurality of ITO bars 106 arranged in parallel to each other on the touch screen 104 to detect the touches and the position of the touches on the touch screen 104. The ITO bars 106 are comprised of single layer ITO material, and function as resistive strips on the touch screen 104. Although not shown in detail in FIGS. 1A and 1B for simplicity of illustration, there are electrical connections 107 to both ends of the ITO bars 106 so that the touch screen controller 102 can be connected to both ends of the ITO bars 106 via the interconnect 108. For purposes of illustration herein, the x direction is the direction across multiple ITO bars 106 and the y direction is along one of the ITO bars 106, as shown in FIG. 1A.

FIG. 2 illustrates how measurements are made in order to determine the y position of a touch along the ITO bars 106 on the touch screen 104 according to one embodiment of the present invention, and FIG. 3 illustrates the equivalent circuit of an ITO bar 106 to show how the y position of the touch along the ITO bars is determined according to one embodiment of the present invention. The touch point 202 disturbs the capacitance 212 of the touch screen 104, and the y position of the touch point 202 along the ITO bar 106 can be measured by the methodology illustrated herein. First, a signal (S) 204 is applied to a first end of one of the ITO bars 106, and the voltage (V) 206 is measured at a second end of that ITO bar 106 opposite to the first end. Such voltage (V) 206 may be measured multiple times, for example, twice, at times t1 and t2. Second, the same procedure is repeated from the other side of the ITO bar 106, i.e., a signal (S) 210 is applied to the second end of said one of the ITO bars 106, and the voltage (V) 208 is measured at the first end of that same ITO bar 106. Such voltage (V) 208 may also be measured multiple times, for example, twice, at times t1' and t2'. The measured effect of the touch 202 on the bar 106 is due to the resistance of the ITO bar 106 to the touch 202, and also the capacitance of the touch 202 to the ITO bars 106. The touch capacitance varies according to the size of finger and the touch pressure, and needs to be eliminated from the measurement. Taking measurements at both ends of the bar 106 allows elimination of the effect of the touch capacitance. After measurement is complete at both ends of one ITO bar 106, the same measurement is repeated for the next ITO bars 106, one by one, via multiplexing circuitry (not shown in FIGS. 2 and 3) selecting one of the ITO bars 106 for measurement.

Referring to the equivalent circuit 300 of the ITO bar 106 in FIG. 3, an ITO bar 106 can be modeled as a series of resistive/capacitive low pass filters each comprised of the resistance 302 of a section of the ITO bar 106 and the stray capacitance 304 of the section of the ITO bar 106 to the touch screen 104. When the signal 204 is input to the first end of the ITO bar 106, the output voltage signal 206 will reflect the filtering effects of the ITO bar 106, as reduction in bandwidth and signal delay. Adding a capacitor (by touching 202) to any position along the ITO bar 106 also reduces the amplitude of the measured signal. This effect is proportional to the y position of the touch 202 along the ITO bar 106, and the magnitude of the touch capacitance 202. In other words, the touch capacitance 202 diverts signal current 204 from the ITO bar 106, and makes the signal rise time slower, which effect is proportional to the y position along the ITO bar 106 as the current decreases linearly along the ITO bar 106.

By taking two voltage measurements ($V_1$ and $V_2$) as illustrated below with reference to FIG. 4, one from each end of the bar (End 1 and End 2), it is possible to cancel the effect of the touch capacitance 202. The y position of the touch 202 (in percentages along the length of the ITO bar 106 measured from the input signal 204 end) is given by $100 \times V_1/(V_1+V_2)$, where $V_1$ is the voltage reduction measured from End 1 (206) when there is a touch, and $V_2$ is the voltage reduction measured from the End 2 (208) when there is a touch. Note that the terms 'End 1' and 'End 2 are merely used herein as differentiating terms, and are interchangeable.

The x position of the touch (across the ITO bars 106) on the touch screen is determined in a different manner. The x position is determined by comparing the detected "touch depth" on each touched bar 106. "Touch depth" refers to the amount of change in the amplitude and the delay in the measured signal 204, 210 in comparison to the applied signal 206, 208. For example, in a particular touch location 202, several ITO bars 106 may show a touch at about the same y location. The locations of the ITO bars showing the deepest touch and the second deepest touch are used to locate the touch, although a different number of the ITO bars may be used. An interpolation is performed between the x positions of the two bars showing the deepest touch and the second deepest touch, using the ratio of the deepest touch to the second deepest touch in the touch locality. Other touches in that locality are suppressed, to avoid reporting several touches, when there is actually only one touch. There may be several touch localities on the screen at one time, and a touch will be detected at each locality.

Figure 4:
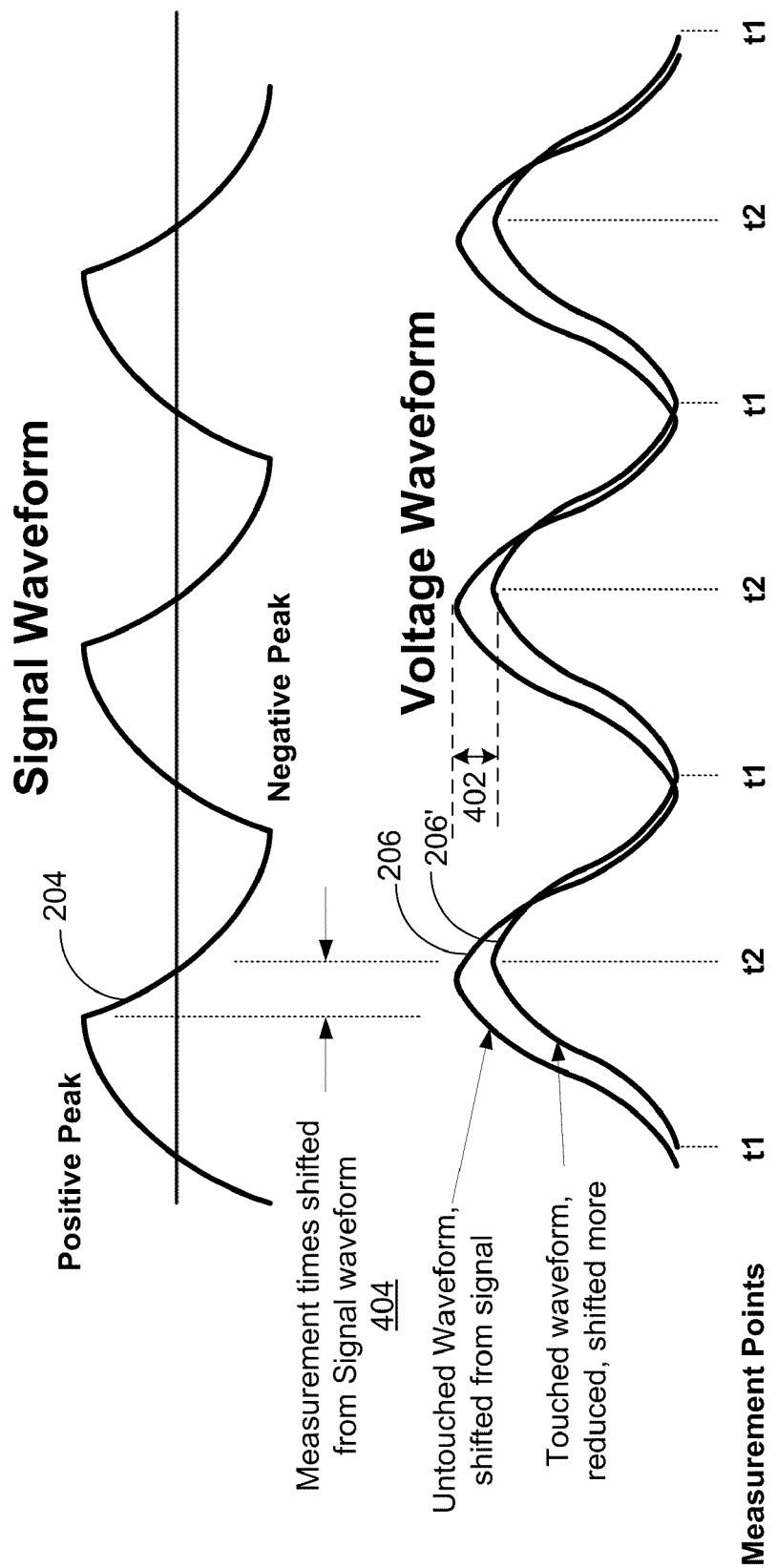
FIG. 4 illustrates the input signals and measured voltage signals used in the method of FIG. 2, in accordance with one embodiment of the present invention.

FIG. 4 illustrates the input signals and measured voltage signals used with the method of FIG. 2 according to one embodiment of the present invention. FIG. 4 shows input signal waveform 204, voltage signal waveform 206 when there is no touch on the ITO bar 106, and voltage signal waveform 206' when there is touch 202 on the ITO bar 106. A variety of shapes of signals may be used as the input signal, including rectangular, triangular, etc. As shown in FIG. 4, the voltage signal waveform 206 when there is no touch is delayed (shifted) with respect to the exciting signal 204. The voltage waveform 206' when there is a touch is delayed (shifted) even further with respect to the exciting signal 204 than the voltage signal 206 and the amplitude of the voltage waveform 206' is reduced 402 in comparison to the amplitude of voltage signal 206. It is this voltage reduction 402 that is measured as the two voltage measurements ($V_1$ and $V_2$). Because of the time delay introduced by the ITO bar 106, the signal measurements are delayed 404 with respect to the exciting signal 204, so that the measurements are taken at the highest and lowest points of the voltage signals 206, 206'. To reduce the effects of noise, the voltage signal peaks and valleys are sampled at times t1, t2 several times, the difference between the voltage measurements on signal 206' and the voltage measurements on signal 206 is determined to obtain the voltage reductions caused by the touch, and the obtained voltage reduction results are averaged to obtain the two voltage reduction measurements ($V_1$ and $V_2$) for use in determining they position of the touch 202. More sophisticated filtering can also be used. Note that a variety of waveforms may be used for the exciting signal 204, including pure voltage drive, pure current drive and voltage drive through resistor. The waveform of the exciting signal 204 shown in FIG. 4 is consistent with use of voltage drive through resistor.

Figure 5:
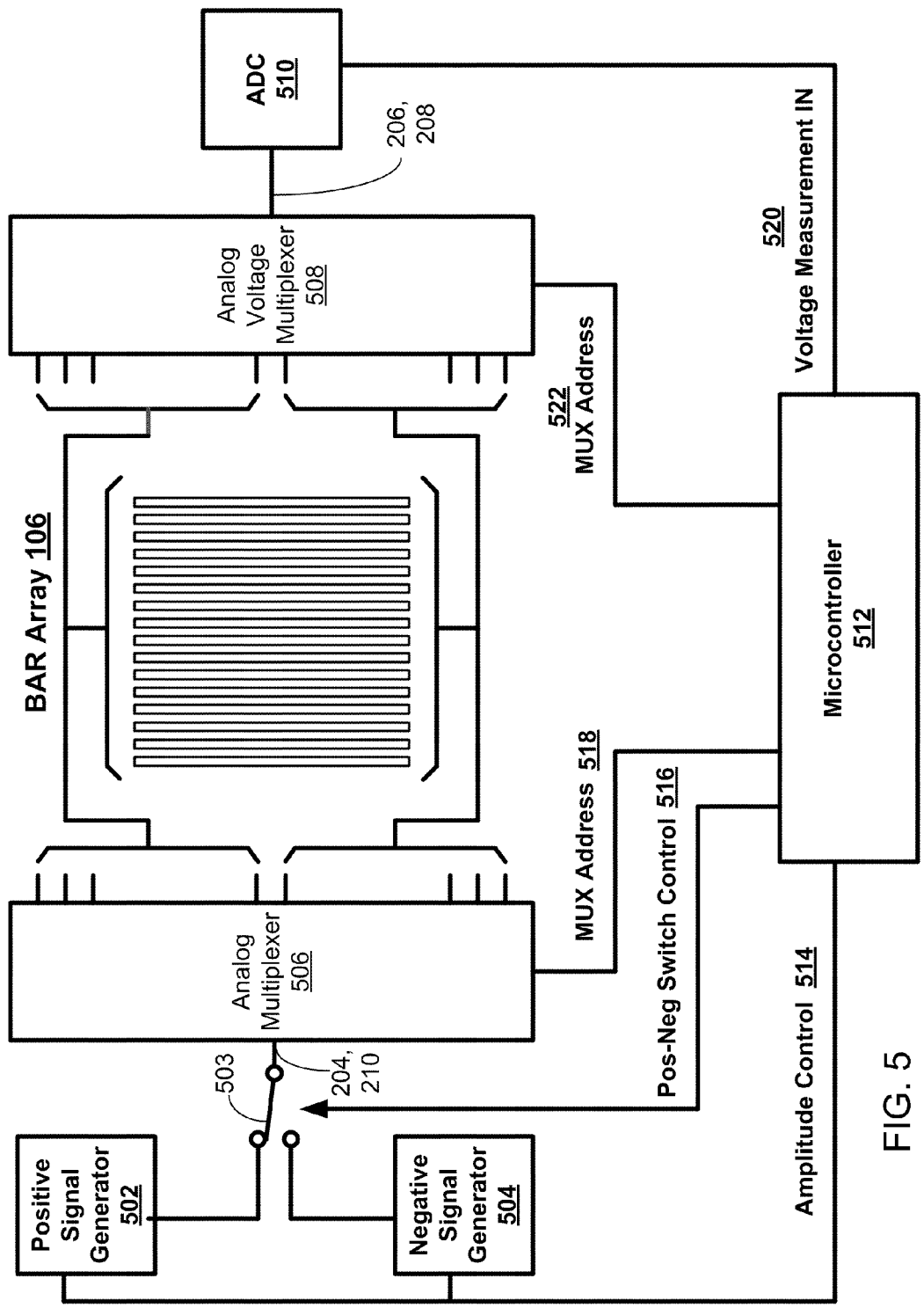
FIG. 5 is a block diagram of the touch screen and its surrounding circuitry, according to one embodiment of the present invention.

FIG. 5 is a block diagram of the touch screen 104 and its surrounding circuitry. The touch screen 104 and the surrounding circuitry includes the ITO bar array 106, microcontroller 512, positive signal generator 502, negative signal generator 504, switch 503, analog multiplexer 506, analog voltage multiplexer 508, and analog-to-digital converter (ADC) 510. Positive signal generator 502 generates the positive side of the applied signal 204, 210, and negative signal generator 504 generates the negative side of the applied signal 204, 210. Microcontroller 512 generates positive-negative switch control signal 516 that controls switch 503 to select either the positive side or the negative side of the applied signal 204, 210 generated by the positive signal generator 502 or the negative signal generator 504, respectively, to generate the applied signal 204, 210. Microcontroller 512 also generates amplitude control signal 514 that is used to adjust the amplitude of either the positive side or the negative side of the applied signal 204, 210 generated by the positive signal generator 502 or negative signal generator 504, respectively. Analog multiplexer 506 steers the applied signal 204 to a first end of one of the ITO bars 106 in response to the MUX address 518 generated by microcontroller 512 to apply the signal 204 to one of the ITO bars 106. Analog voltage multiplexer 508 connects to a second end of said one of the ITO bars 106 in response to the MUX address 522 generated by microcontroller 512 to measure the voltage signal 206 at the second end of the ITO bar 106. The measured voltage signal 206 is converted to a digital value (Voltage Measurement IN 520) by the ADC 510, and input to the microcontroller 512 for measurement. As explained above, such application of the signal 210 is also reversed to the second end of said one of the ITO bars 106 by control of the analog multiplexer 506, and the voltage signal 208 is also measured at the first end of said one of the ITO bars 106. Then, as explained above, such application of the signals 204, 210 is repeated to subsequent ones of the ITO bars 106, one by one, under similar control of the microcontroller 512, analog multiplexer 506, analog voltage multiplexer 508, and the MUX address signals 518, 522.

Figure 6:
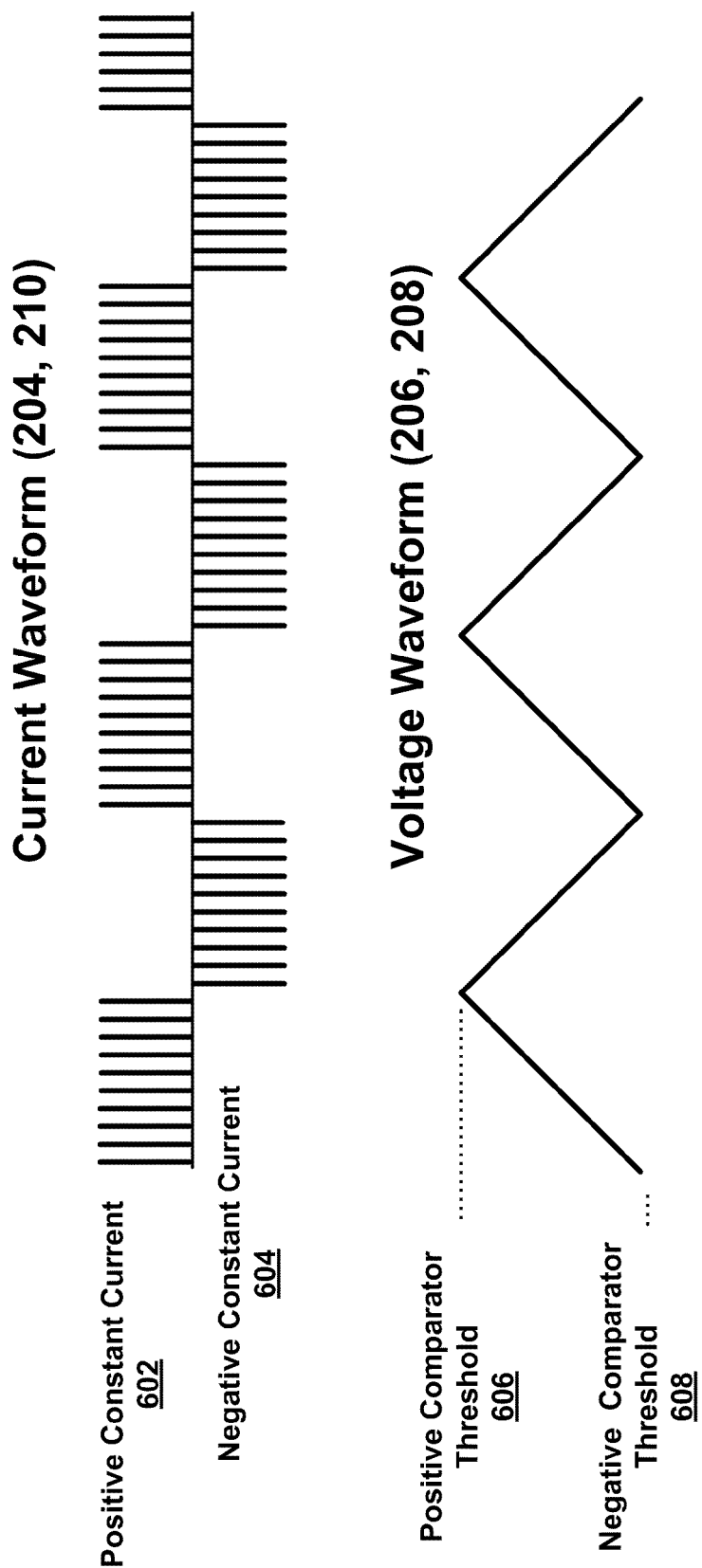
FIG. 6 illustrates digital drive signals applied to the ITO bars for determining the y position of touches on the touch screen, according to another embodiment of the present invention.

FIG. 6 illustrates digital drive signals 204, 210 that may be applied to the ITO bars 106 for determining the y position of touches on the touch screen, according to another embodiment of the present invention. The digital drive signals have pulses of positive constant current 602 and pulses of negative constant current 604, alternating with each other to form the digital drive signals 204, 210. The positive and negative constant current pulses 602, 604 may conform to an envelope similar to the analog signals for driving the ITO bars 106, which drive the ITO bars 106 both positively and negatively, in a window set by two comparators (not shown herein). Positive current pulses 602 are applied until the measured voltages 206, 208 reach the positive comparator threshold 606. Negative current pulses 604 are then applied until the measured voltages 206, 208 reach the negative comparator threshold 608. The number of pulses to move from one comparator threshold to the other (i.e., threshold 606 to 608, and vice versa) can be counted using a counter, and is a measure of the current required to charge and discharge the circuit capacitance in the ITO bars 106. From the counted number of pulses, the change in circuit capacitance caused by touches on the touch screen can be measured. If the number of pulses needed to move the signal from the negative comparator threshold 608 to the positive comparator threshold 606 when there is no touch is N1 and N2 from each end of the ITO bar, and if the number of pulses needed to move the signal from the negative comparator threshold 608 to the positive comparator threshold 606 when there is touch is n1 and n2 from each of the ITO bar, then the position of the touch along the ITO bar 106, as a percentage from the end of the ITO bar 106 where N1 measurement was taken, is given by $100 \times (N1-n1)/[(N1-n1)+(N2-n2)]$. Note that the counter may be a synchronous counter and the comparator may be a gated comparator, for noise reduction.

Figure 7:
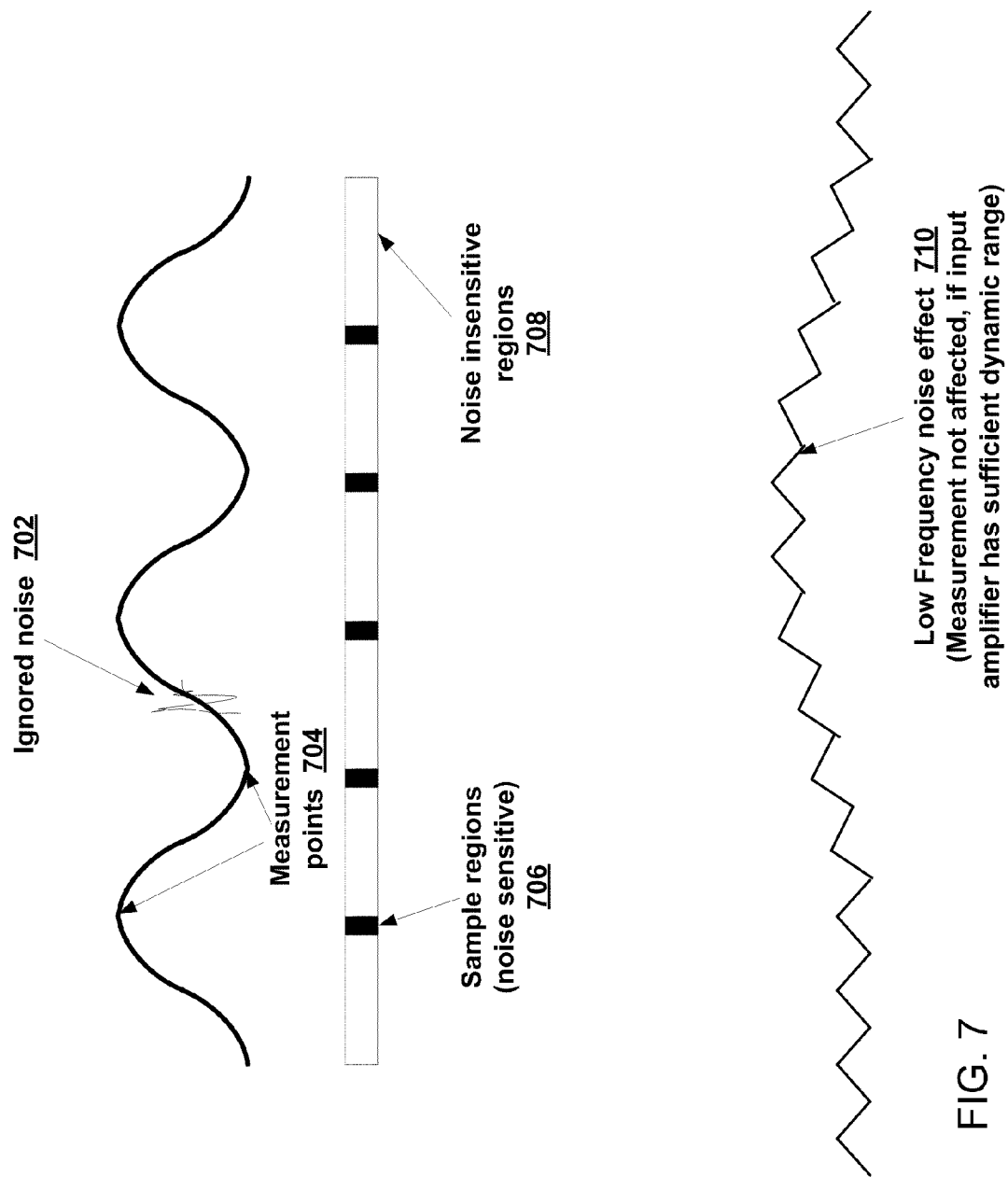
FIG. 7 illustrates how the voltage signals on the ITO bars may be measured to improve noise performance, according to one embodiment of the present invention.

FIG. 7 illustrates how the voltage signals 204, 208 may be measured to improve noise performance, according to one embodiment of the present invention. The voltage measurements are taken synchronously with the waveform of the driving signal 202, 210, and thus the acquisitions are very low frequency signals that can be easily filtered. Additionally, a track and hold circuit (not shown herein) of the ADC 510 (FIG. 5) is in 'track' mode for only a very small part of the measurement cycle (i.e., sample regions 706), reducing the noise sensitive window to a very small part of the measurement cycle, as shown in FIG. 7. The periods 708 outside the sample regions are insensitive to noise. Because differential measurements are taken of the peaks and valleys of the voltage signal 204, low frequency noise 710 is rejected as shown in FIG. 7. In this regard, the voltage measurement system should have sufficient dynamic range to accommodate the voltage signal range.

Figure 8:
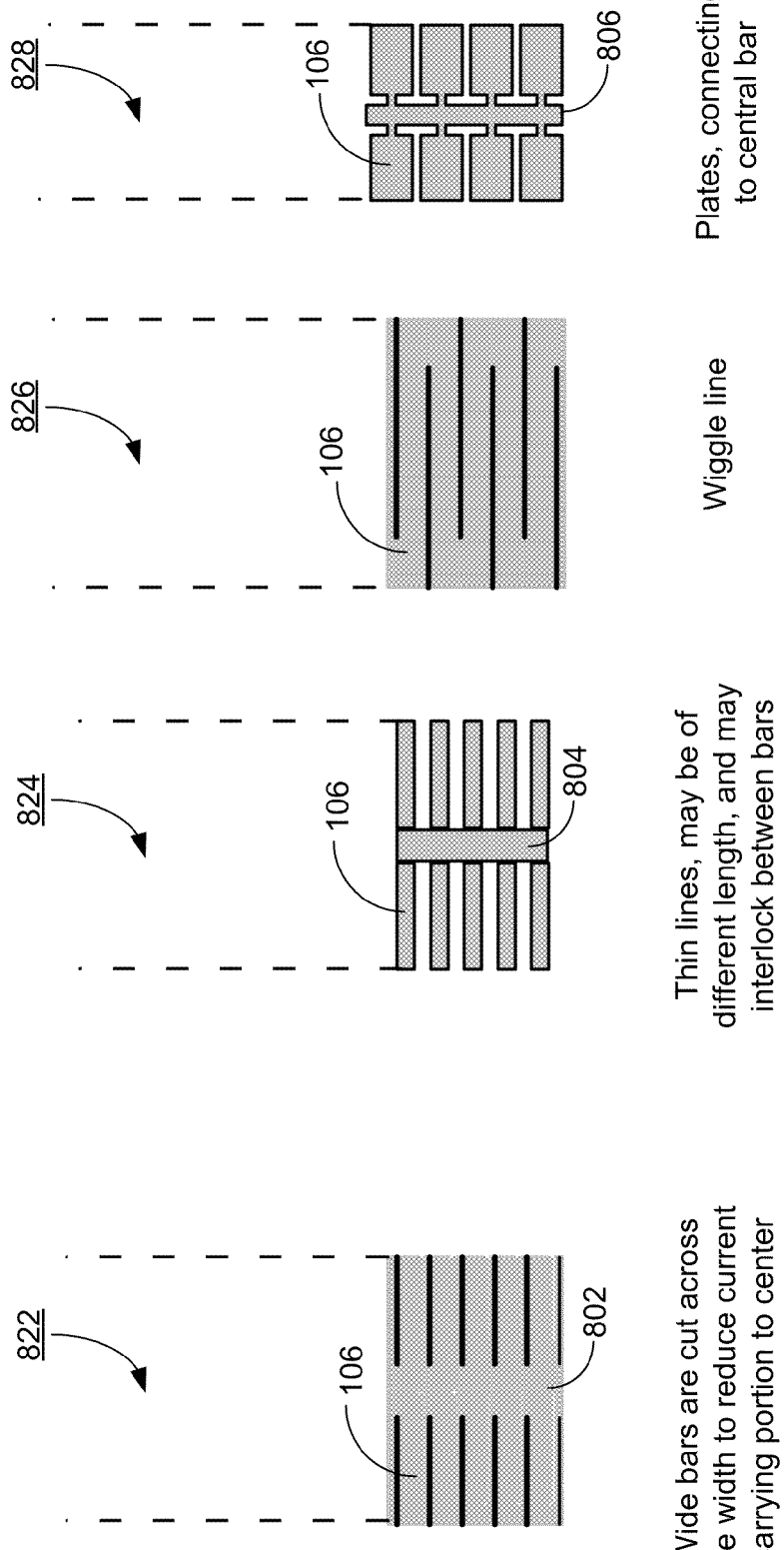
FIG. 8 illustrates the shape of the ITO bar patterns, according to various embodiments of the present invention.

FIG. 8 illustrates the shape of the ITO bar patterns according to various embodiments of the present invention. For the touch screen system to be sensitive to the small capacitances from touch, the bar resistance needs to be fairly high, which can be obtained by using a narrow ITO bar 106. However, the ITO bar 106 must not be too narrow because the capacitance of the ITO bar 106 is proportional to its area; otherwise the capacitance of the ITO bar 106 may be too small. The resistance of the ITO bar 106 is inversely proportional to its width, and the touch capacitance effect of the ITO bar 106 is directly proportional to its width. Because the resistance range of ITO is limited, the ITO bars 106 are fabricated with shapes to increase the effective width of the ITO bar 106 for touch capacitance, while reducing its effective width for increased bar resistance.

For example, ITO bar pattern 822 has wide ITO bars 106 cut across the width of the bar-like section with the current carrying portion reduced to the center portion 802. For another example, ITO bar pattern 824 has ITO bars 106 with thin-line shapes that may have same or different length, and the pattern may interlock between the bars 106. The current carrying portion is also reduced to the center portion 804. For still another example, the ITO bars may have the shape 826 of a long wiggle line. For still another example, ITO bar pattern 828 may have the shape of ITO plates 106 connecting to the central bar 806.

Figure 9:
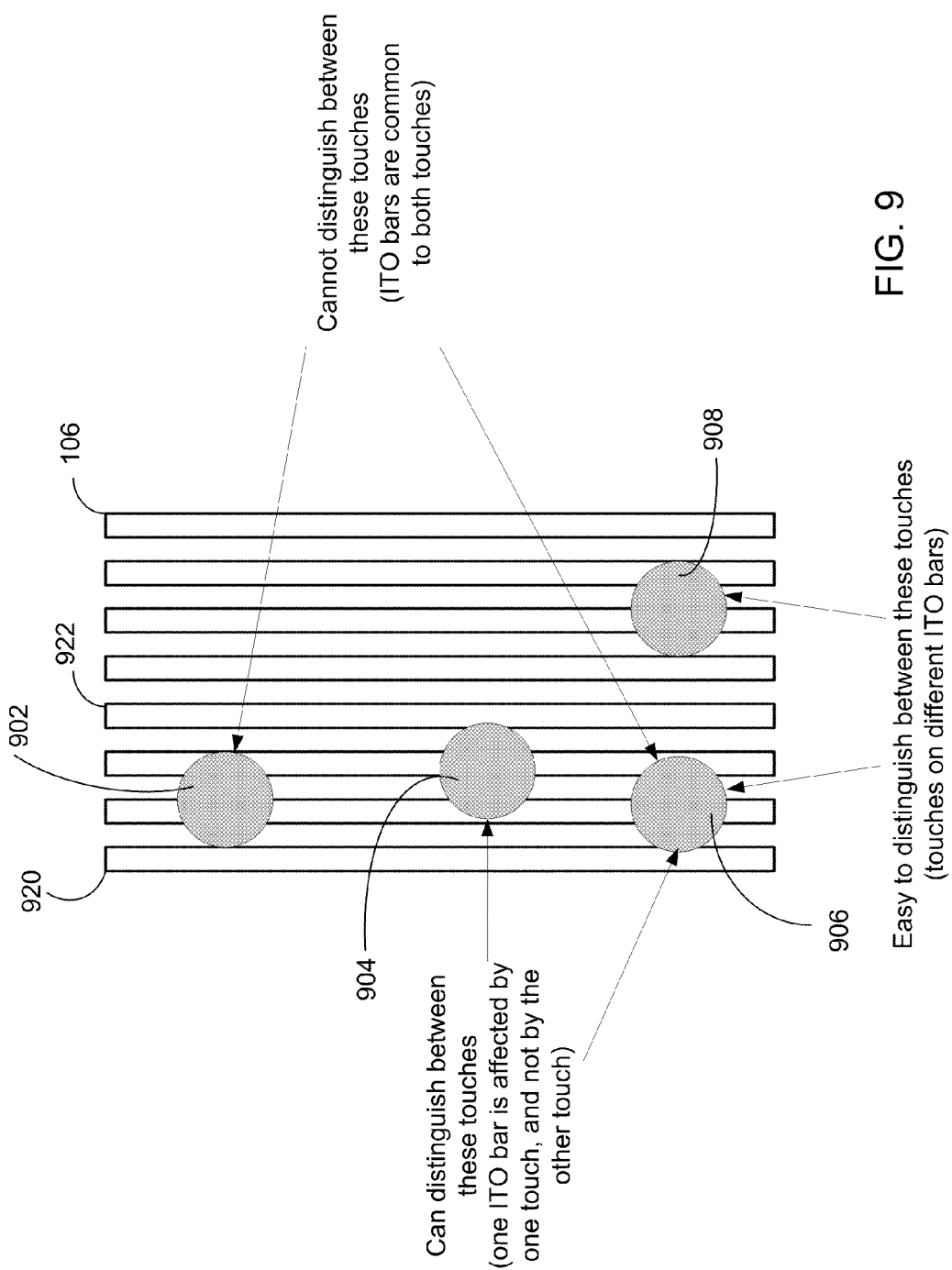
FIG. 9 illustrates how multiple touches on the touch screen are detected, according to one embodiment of the present invention.

FIG. 9 illustrates how multiple touches on the touch screen are detected according to one embodiment of the present invention. If multiple touches are applied to the touch screen substantially simultaneously affecting ITO bars unaffected by any of the other touches, their positions can be readily detected because the voltage signals on each of the ITO bars are separately detected by multiplexing. For example, touches 906, 908 can be easily distinguished. If touches overlap, i.e., more than one touch affects some of the ITO bars, it may be more difficult to distinguish between them but they can be distinguished. For example, touches 904, 906 may be distinguished, because if two touches 904, 906 are present but at least one bar is unique to each touch (that is, ITO bar 920 is unique to only touch 906 and ITO bar 922 is unique to only touch 904) then this situation will appear to the firmware of the touch screen controller 102 to be three touches—two touches on unique bars 920, 922, and a third touch at the average of these two bars 920, 922 on the other touched bars. A microcontroller running firmware can distinguish between these touches and develop x, y positions for the two touches 904, 906. If the ITO bars 106 are common to both touches and occur substantially simultaneously, they cannot be distinguished. For example, touches 902, 906 cannot be distinguished from each other if the touches 902, 906 are made at the same time overlapping the same ITO bars. However, if touches 902, 906 are timed even slightly differently, they may be distinguished. Also, the applications using the touch screen may be designed to avoid simultaneous touches on the same ITO bars.

According to the present invention, the touch screens including parallel ITO bars may achieve a multiple touch screen with reduced noise sensitivity, using single layer ITO on the touch screen.

Upon reading this disclosure, those of skill in the art will appreciate still additional alternative designs for multi-touch touch screen using parallel ITO bars. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A touch screen, comprising:
   a plurality of conductive bars arranged in parallel to each other, each of the conductive bars including a single conductive layer with a substantially rectangular shape; and
   a touch screen controller coupled to the conductive bars, the controller configured to:
   apply a first excitation signal to a first end of one of the conductive bars and measure a first response signal corresponding to the first excitation signal at a second end of said one of the conductive bars, the touch screen controller configured to determine a position of a touch on said one of the conductive bars in a first direction along said one of the conductive bars based on a first difference between the first response signal and the first excitation signal;
   apply a second excitation signal to the second end of said one of the conductive bars and measure a second response signal at the first end of said one of the conductive bars, the touch screen controller configured to determine the position of the touch on said one of the conductive bars in the first direction along said one of the conductive bars based on the first difference between the first response signal and the first excitation signal and a second difference between the second response signal and the second excitation signal; and
   determine the positions of multiple touches on the touch screen that occur substantially simultaneously on different ones of the conductive bars.

2. The touch screen of claim 1, wherein the first difference is a first voltage difference V1 between the peak voltages of the first excitation signal and the first response signal, the second difference is a second voltage difference V2 between the peak voltages of the second excitation signal and the second response signal, and the position of the touch in percentage from the first end on said one of the conductive bars is given by $100 \times V1/(V1+V2)$.

3. The touch screen of claim 2, further comprising:
   signal generation circuitry for generating the first excitation signal and the second excitation signal;
   first multiplexing circuitry for selecting and coupling said one of the conductive bars to the signal generation circuitry to apply the first excitation signal and the second excitation signal to said one of the conductive bars;
   voltage measurement circuitry for measuring voltages of the first response signal and the second response signal; and
   second multiplexing circuitry for selecting and coupling said one of the conductive bars to the voltage measurement circuitry to determine the first voltage difference and the second voltage difference.

4. The touch screen of claim 1, wherein the first difference and the second difference are measured multiple times and averaged.

5. The touch screen of claim 1, wherein the touch screen controller is further configured to determine the position of the touch in a second direction across the conductive bars by interpolation of positions in the second direction of two of the conductive bars with a deepest touch and a second deepest touch.

6. The touch screen of claim 1, wherein the single conductive layer is a single layer of indium tin oxide (ITO).

7. A touch screen, comprising:
   a plurality of conductive bars arranged in parallel to each other, each of the conductive bars including a single conductive layer with a substantially rectangular shape; and
   a touch screen controller coupled to the conductive bars, the controller configured to apply a first excitation signal including digital pulses to a first end of one of the conductive bars and measure a first response signal corresponding to the first excitation signal at a second end of said one of the conductive bars both with and without a touch on said one of the conductive bars, and the touch screen controller further configured to apply a second excitation signal including the digital pulses to the second end of said one of the conductive bars and measure a second response signal corresponding to the second excitation signal at the second end of said one of the conductive bars both with and without a touch on said one of the conductive bars, the touch screen controller configured to measure a first difference value (N1−n1) between a first number n1 of the digital pulses and a second number N1 of the digital pulses needed for the first response signal to move from a first predetermined threshold to a second predetermined threshold with and without the touch, respectively, the touch screen controller configured to measure a second difference value (N2−n2) between a third number n2 of the digital pulses and a fourth number N2 of the digital pulses needed for the second response signal to move from the first predetermined threshold to the second predetermined threshold with and without the touch, respectively, and the touch screen controller determining a position of the touch on said one of the conductive bars in a direction along said one of the conductive bars based on the first difference value (N1−n1) and the second difference value (N2−n2).

8. The touch screen of claim 7, wherein the position of the touch in percentage from the first end on said one of the conductive bars is given by 100×(N1−n1)/[(N1−n1)+(N2−n2)].

9. The touch screen of claim 7, wherein the single conductive layer is a single layer of indium tin oxide (ITO).

10. In a touch screen including a plurality of conductive bars arranged in parallel to each other, each of the conductive bars including a single conductive layer with a substantially rectangular shape, a method of determining a position of a touch on the touch screen, the method comprising:
  applying a first excitation signal to a first end of one of the conductive bars;
  measuring a first response signal corresponding to the first excitation signal at a second end of said one of the conductive bars;
  determining the position of a touch on said one of the conductive bars in a first direction along said one of the conductive bars based on a first difference between the first response signal and the first excitation signal;
  applying a second excitation signal to the second end of said one of the conductive bars;
  measuring a second response signal at the first end of said one of the conductive bars;
  determining the position of the touch on said one of the conductive bars in the first direction along said one of the conductive bars based on the first difference between the first response signal and the first excitation signal and a second difference between the second response signal and the second excitation signal; and
  determining the positions of multiple touches on the touch screen that occur substantially simultaneously on different ones of the conductive bars.

11. The method of claim 10, wherein the first difference is a first voltage difference V1 between the peak voltages of the first excitation signal and the first response signal, the second difference is a second voltage difference V2 between the peak voltages of the second excitation signal and the second response signal, and the position of the touch in percentage from the first end on said one of the conductive bars is given by 100×V1/(V1+V2).

12. The method of claim 10, wherein the first difference and the second difference are measured multiple times and averaged.

13. The method of claim 10, further comprising determining the position of the touch in a second direction across the conductive bars by interpolation of positions in the second direction of two of the conductive bars with a deepest touch and a second deepest touch.

14. The method of claim 10, wherein the single conductive layer is a single layer of indium tin oxide (ITO).

15. In a touch screen including a plurality of conductive bars arranged in parallel to each other, each of the conductive bars including a single conductive layer with a substantially rectangular shape, a method of determining a position of a touch on the touch screen, the method comprising:
  applying a first excitation signal including digital pulses to a first end of one of the conductive bars both with and without a touch on said one of the conductive bars;
  measuring a first response signal corresponding to the first excitation signal at a second end of said one of the conductive bars both with and without the touch on said one of the conductive bars;
  applying a second excitation signal including the digital pulses to the second end of one of the conductive bars both with and without the touch on said one of the conductive bars;
  measuring a second response signal corresponding to the second excitation signal at the second end of said one of the conductive bars both with and without the touch on said one of the conductive bars;
  determining a first difference value (N1−n1) between a first number n1 of the digital pulses and a second number N1 of the digital pulses needed for the first response signal to move from a first predetermined threshold to a second predetermined threshold with and without the touch, respectively,
  determining a second difference value (N2−n2) between a third number n2 of the digital pulses and a fourth number N2 of the digital pulses needed for the second response signal to move from the first predetermined threshold to the second predetermined threshold with and without the touch, respectively, and
  determining the position of the touch on said one of the conductive bars in a direction along said one of the conductive bars based on the first difference value (N1−n1) and the second difference value (N2−n2).

16. The method of claim 15, wherein the position of the touch in percentage from the first end on said one of the conductive bars is given by 100×(N1−n1)/[(N1−n1)+(N2−n2)].

17. The method of claim 15, wherein the single conductive layer is a single layer of indium tin oxide (ITO).

* * * * *